(12) United States Patent
Braedt (10) Patent No.: US 7,959,529 B2
(45) Date of Patent: Jun. 14, 2011

(54) BICYCLE MULTI-GEAR CASSETTE

(75) Inventor: Henrik Braedt, Würzburg (DE)

(73) Assignee: SRAM, LLC, Chicago, IL (US)

( * ) Notice: Subject to any disclaimer, the term of this patent is extended or adjusted under 35 U.S.C. 154(b) by 27 days.

(21) Appl. No.: 11/859,479

(22) Filed: Sep. 21, 2007

(65) Prior Publication Data

US 2008/0234082 A1  Sep. 25, 2008

Related U.S. Application Data

(63) Continuation-in-part of application No. 11/690,761, filed on Mar. 23, 2007, which is a continuation-in-part of application No. 11/689,466, filed on Mar. 21, 2007.

(51) Int. Cl.
*F16H 7/14* (2006.01)

(52) U.S. Cl. ............ 474/160; 474/77; 474/78; 474/152; 474/156; 474/158; 474/164

(58) Field of Classification Search .......... 474/157–165, 474/152; 192/64
See application file for complete search history.

(56) References Cited

U.S. PATENT DOCUMENTS

| | | | |
|---|---|---|---|
| 4,472,163 A * | 9/1984 | Bottini | 474/160 |
| 4,889,521 A | 12/1989 | Nagano | |
| 5,194,051 A | 3/1993 | Nagano | |
| 5,413,534 A * | 5/1995 | Nagano | 474/78 |
| 5,503,600 A | 4/1996 | Berecz | |
| 5,733,215 A | 3/1998 | Hsu et al. | |
| 5,788,593 A * | 8/1998 | Tiong | 474/160 |
| 6,340,338 B1 * | 1/2002 | Kamada | 474/160 |
| 6,428,437 B1 * | 8/2002 | Schlanger | 474/160 |
| 6,488,603 B2 * | 12/2002 | Lim et al. | 474/160 |
| 2005/0090349 A1* | 4/2005 | Lee | 474/160 |
| 2006/0063624 A1 | 3/2006 | Voss | |

FOREIGN PATENT DOCUMENTS

| | | |
|---|---|---|
| DE | 78 16 931 U1 | 11/1979 |
| EP | 0 444 645 | 9/1991 |
| EP | 0 834 450 | 4/1998 |
| EP | 1 413 508 | 4/2004 |

OTHER PUBLICATIONS

Photograph of a plastic cassette cut in half, Circa 1996.

* cited by examiner

*Primary Examiner* — Robert Siconolfi
*Assistant Examiner* — San Aung
(74) *Attorney, Agent, or Firm* — Milan Milosevic; Lisa Serdynski; Steven Courtright (57) ABSTRACT

A bicycle multi-gear cassette mountable to a wheel hub that generally includes a truncated conical shell and a plurality of toothed sprockets having different numbers of teeth. The shell includes a plurality of coaxial annular cylinders of variable diameter extending along an axis of the shell and a plurality of coaxial annular discs of variable diameter extending radially of the axis. The cylinders and discs are alternatingly arranged in a stepped sequence. The toothed sprockets are disposed on the shell and extend radially of the shell axis. At least one of the toothed sprockets includes a recess on a side facing an adjacent toothed sprocket having a smaller number of teeth. The recess includes a first region having a first depth and a second region having a second depth. The first depth is greater than the second depth. The shell and the plurality of toothed sprockets embody a single piece.

17 Claims, 12 Drawing Sheets

BICYCLE MULTI-GEAR CASSETTE

RELATED APPLICATION DATA

This application is a continuation-in-part of U.S. application Ser. No. 11/690,761 filed on Mar. 23, 2007, entitled "Bicycle Multi-Gear Cassette," which is a continuation-in-part of U.S. application Ser. No. 11/689,466 filed on Mar. 21, 2007, entitled "Bicycle Multi-Gear Cassette."

BACKGROUND OF THE INVENTION

The present invention relates to bicycle multi-gear cassettes, and more particularly, to a single-piece multi-gear cassette that includes a truncated conical shell and a plurality of toothed sprockets disposed thereon wherein at least one toothed sprocket includes a recess on a side facing an adjacent toothed sprocket having a smaller number of teeth.

SUMMARY OF THE INVENTION

An object of the present invention is to provide a lightweight single-piece multi-gear cassette that includes at least one toothed sprocket having a recess on a side facing an adjacent toothed sprocket having a smaller number of teeth without compromising the structure of the cassette.

The present invention provides a bicycle multi-gear cassette that generally includes a truncated conical shell and a plurality of toothed sprockets having different numbers of teeth, wherein the shell and sprockets embody a single piece. The shell includes a plurality of coaxial annular cylinders of variable diameter extending along an axis and a plurality of coaxial annular discs of variable diameter extending radially of the axis. The cylinders and discs are alternatingly arranged in a stepped sequence. The toothed sprockets are disposed on the shell and extend radially of the axis. At least one of the plurality of toothed sprockets includes a recess on a side facing an adjacent toothed sprocket having a smaller number of teeth. Recesses on adjacent sprockets may be angularly arranged about the sprocket circumferences to accommodate a chain being downshifted from a sprocket having a smaller number of teeth to an adjacent sprocket having a larger number of teeth.

In another embodiment of the present invention, the recess includes a first region having a first depth and a second region having a second depth. The first depth is greater than the second depth. The first depth may be disposed on the sprocket and the second depth may be disposed on the shell.

In another embodiment of the present invention, the shell has a first opening proximate a small shell base and a second opening proximate a large shell base. The first and second openings are coaxial with the axis of the shell. A torque load transmitting profile is configured on the shell at the small shell base, at the large shell base, or at an axially-interior location on the shell proximate the small or large bases, or any combination thereof. Likewise, a radial load transmitting profile is configured at the small shell base, at the large shell base, or at an axially-interior location on the shell proximate the small or large bases, or any combination thereof. The radial and torque load transmitting profiles are positioned on the shell to stably support the cassette when mounted on the wheel hub. The shell, sprockets and the load transmitting profiles embody a single piece.

In another embodiment of the present invention, a torque load transmitting profile is configured at or proximate an axially-outermost cylinder or disc or any combination thereof. Likewise, a radial load transmitting profile is configured at or proximate an axially-outermost cylinder or disc or any combination thereof. The cylinders, discs, sprockets and load transmitting profiles embody a single piece.

In another embodiment of the present invention, the bicycle multi-gear cassette may include a cap member that is coupled to or proximate the large shell base and extends radially of the shell axis. The cap member includes a third opening coaxial with the shell axis for receiving a hub driver mechanism. The first opening of the small shell base is configured for receiving the wheel hub. The torque load transmitting profile is configured at either the first or third openings, or both, for transmitting torque load to the wheel hub. The radial load transmitting profile is configured at either the first or third openings, or both, for transmitting radial load to the wheel hub.

These and other features and advantages of the present invention will be more fully understood from the following description of one or more embodiments of the invention, taken together with the accompanying drawings.

DETAILED DESCRIPTION

Figure 6:
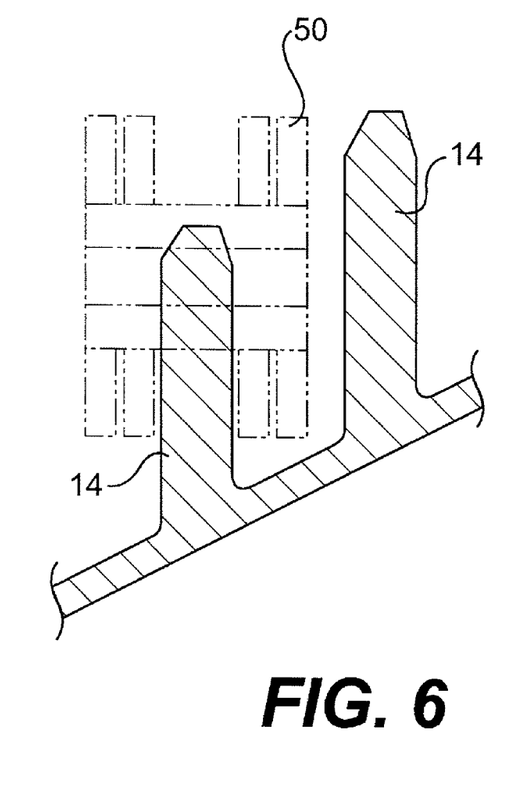
FIG. 6 is a detailed cross-sectional view of a bicycle chain engaging a sprocket tooth of the bicycle multi-gear cassette of FIG. 5.
Figure 7:
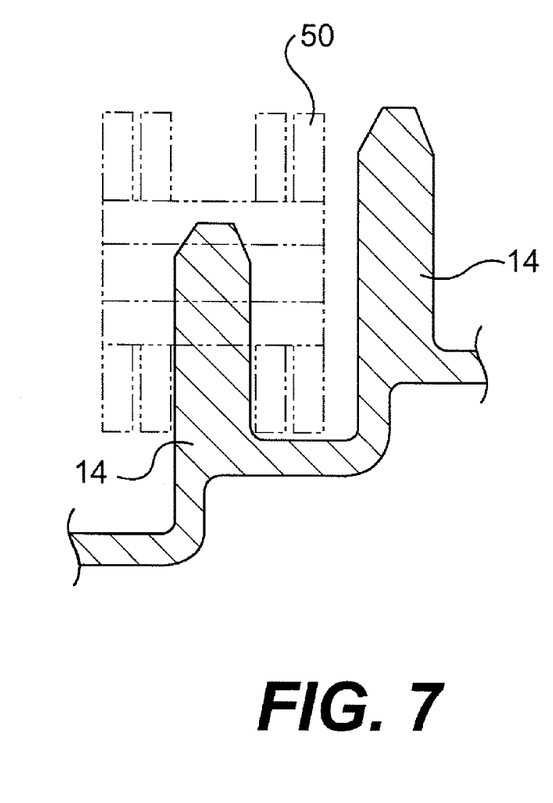
FIG. 7 is a detailed cross-sectional view of a bicycle chain engaging a sprocket tooth of the bicycle multi-gear cassette of FIG. 1.

FIGS. 1-4a and 7 illustrate a bicycle multi-gear or multi-sprocket cassette 10 according to one embodiment of the present invention. The sprocket cassette 10 generally includes a truncated conical shell 12, a plurality of toothed sprockets 14, torque and radial load transmitting profiles 30, 38, 46, wherein the shell 12, toothed sprockets 14 and load transmitting profiles 30, 38, 46 embody a single piece. The single-piece construction may be achieved by any number of manufacturing processes, including for example, forming, casting, forging, or machining. The toothed sprockets 14 have different diameters and are disposed radially on the shell 12 relative to a shell axis 18. Each sprocket 14 includes a plurality of teeth 48 spaced around of the periphery of the sprocket 14 for engaging a bicycle chain 50 (FIGS. 6 and 7), each sprocket having a different number of teeth.

In the embodiment shown, the shell 12 has a stepped configuration; however the shell may assume any linear or non-linear shape that properly positions the toothed sprockets. In the stepped embodiment shown, the shell 12 includes a plurality of coaxial annular cylinders 16 of variable diameter extending along the shell axis 18 and a plurality of coaxial annular discs 20 of variable diameter extending radially of the shell axis 18. The cylinders 16 and the discs 20 are alternatingly arranged in a stepped sequence to form the truncated conical shell 12. Each annular cylinder 16 has a thickness smaller than a thickness of a base 15 of the adjoining sprocket 14 and each annular disc 20 has a thickness smaller than the thickness of the base 15 of the adjoining sprocket 14.

Figure 1:
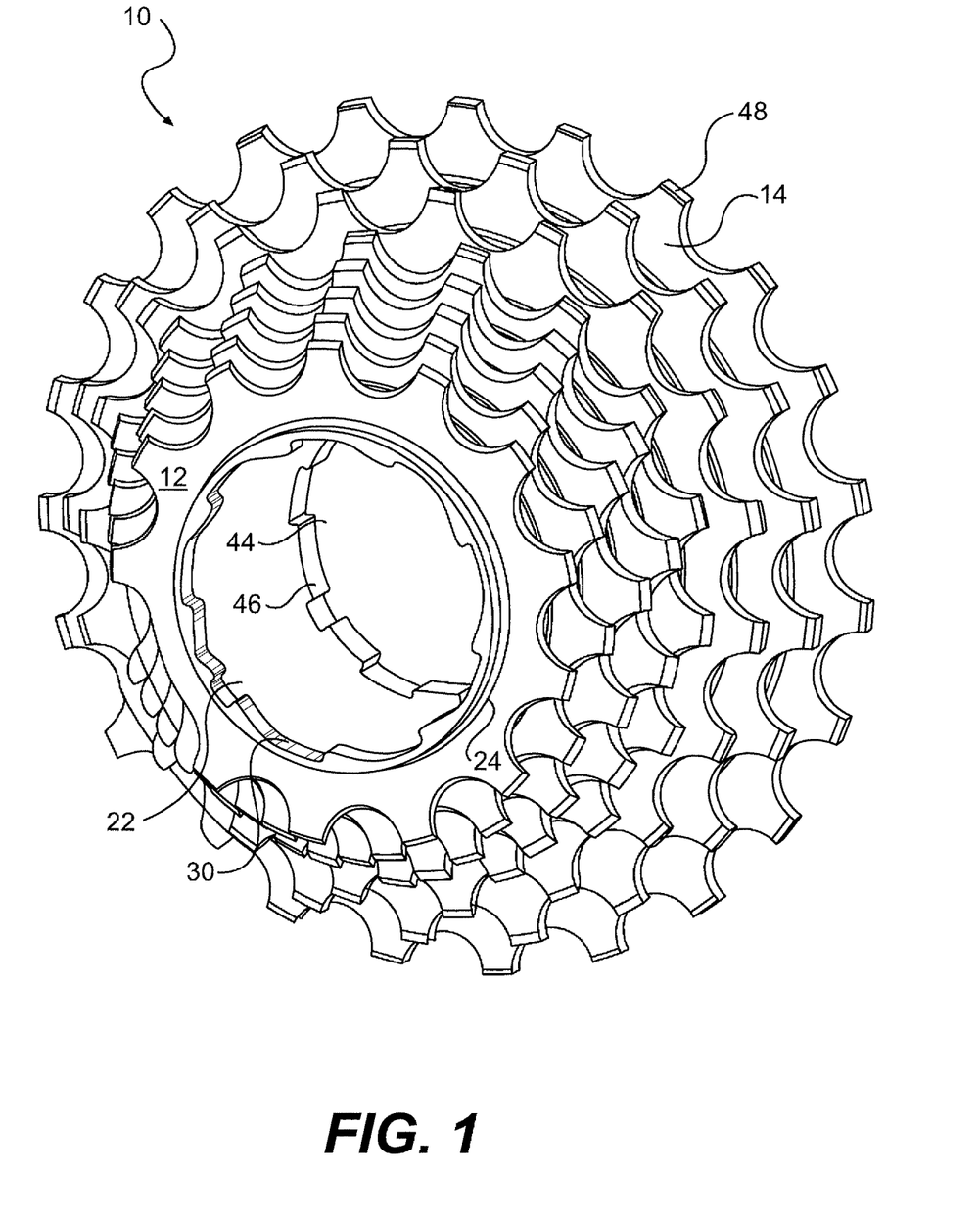
FIG. 1 is a front perspective view of a bicycle multi-gear cassette accordance to one embodiment of the present invention.
Figure 2:
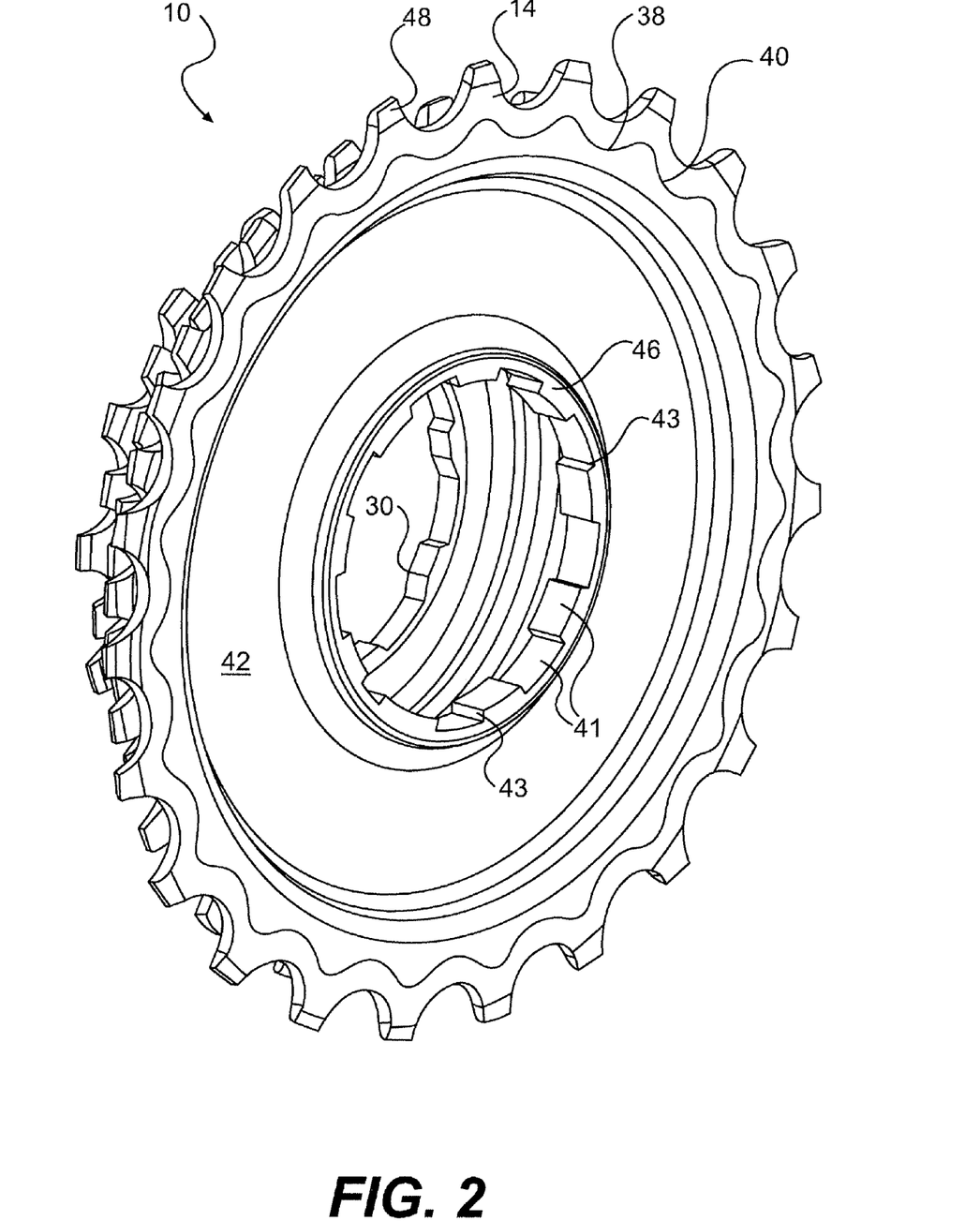
FIG. 2 is a rear perspective view of the bicycle multi-gear cassette of FIG. 1.
Figure 3:
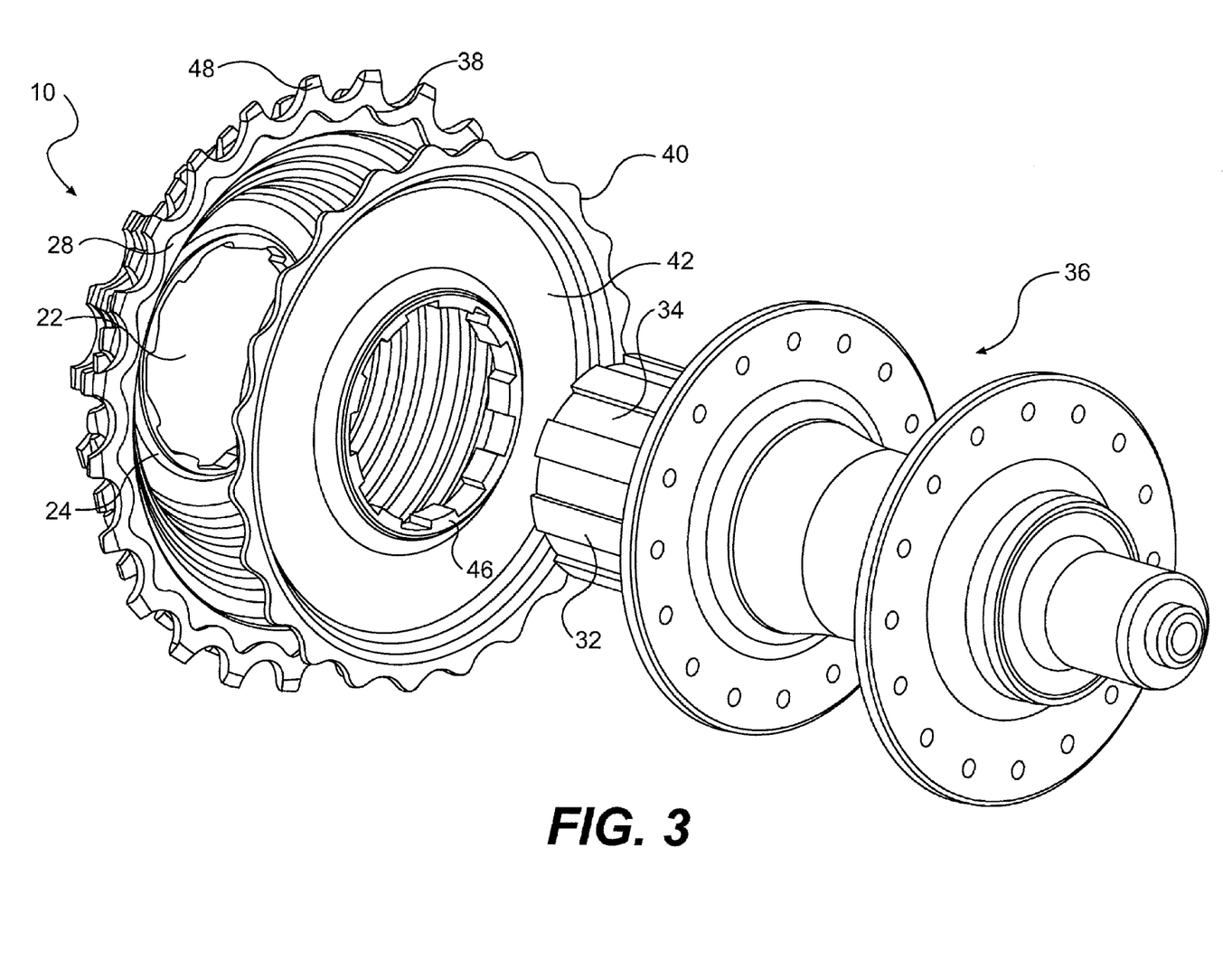
FIG. 3 is an exploded rear perspective view of the bicycle multi-gear cassette of FIG. 1 and a mating wheel hub.
Figure 4A:
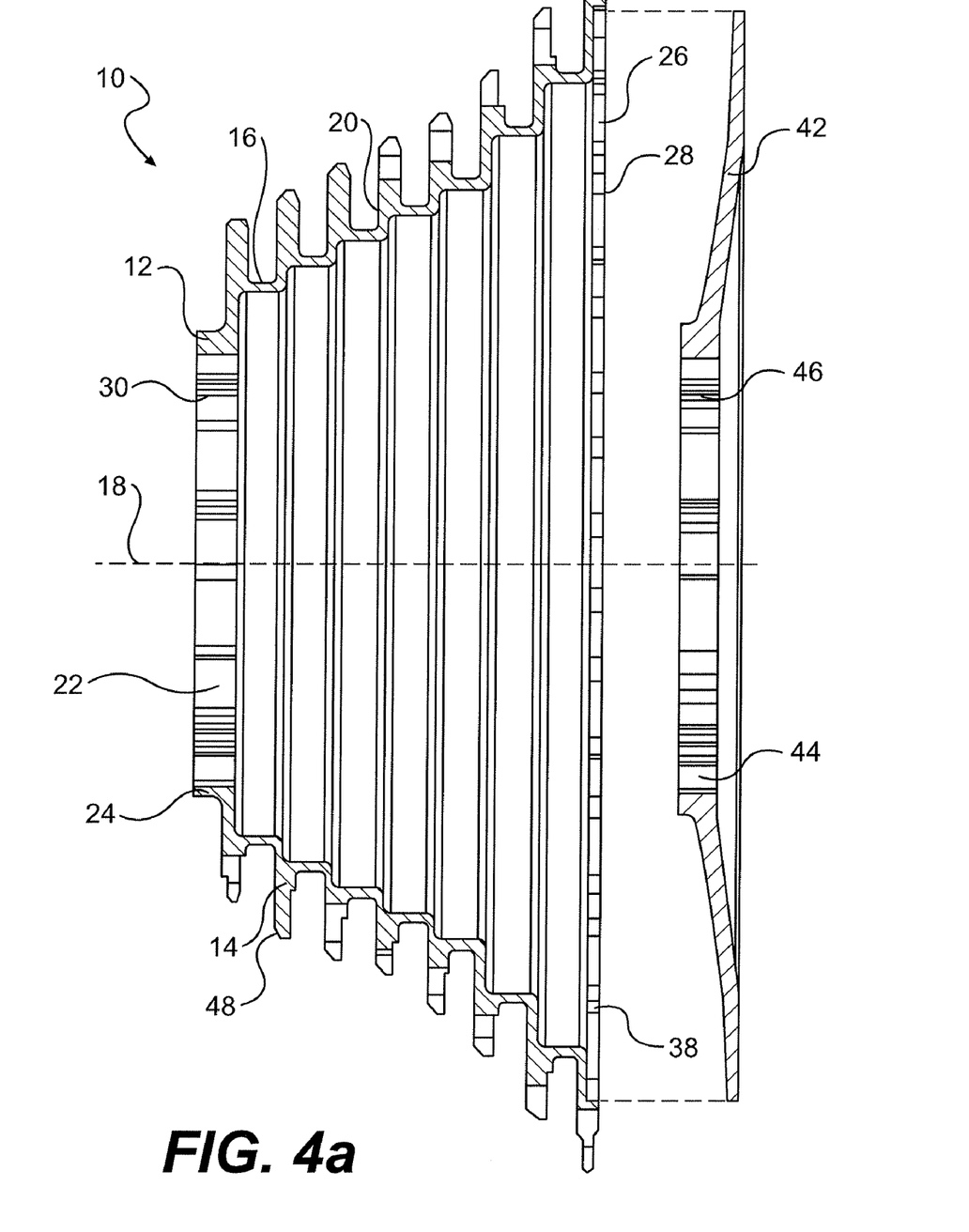
FIG. 4a is an exploded cross-sectional view of the bicycle multi-gear cassette of FIG. 1.
Figure 4B:
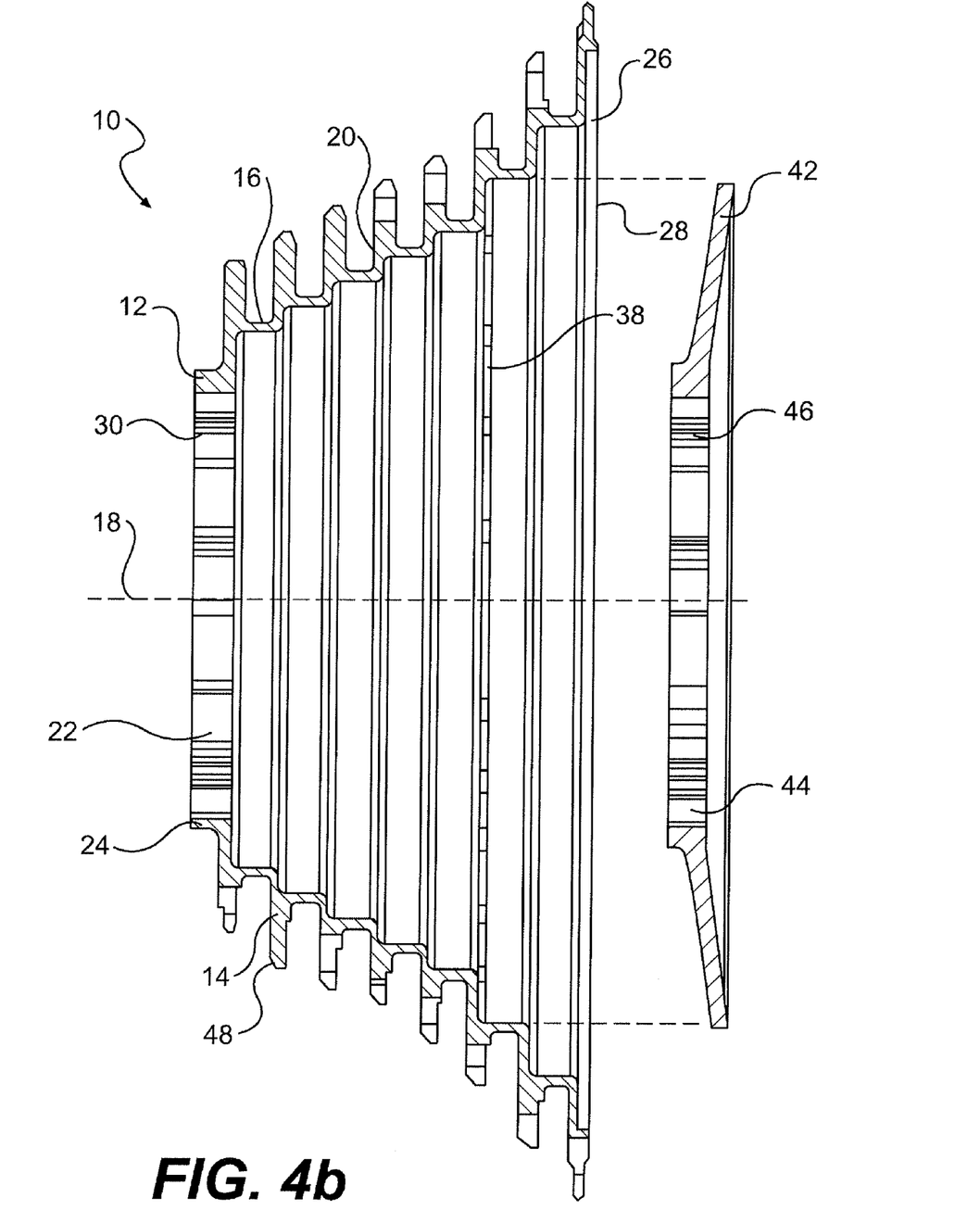
FIG. 4b is an exploded cross-sectional view of an additional embodiment of the invention including a cap member attachable to interior portion of the shell.

The truncated conical shell 12 further includes a first opening 22 at a small shell base 24 and a second opening 26 at a large shell base 28. The first and second openings 22, 26 are coaxial with and substantially perpendicular to the shell axis 18. The shell 12 includes the torque and radial load transmitting profile 30 at the small shell base 24 on an inner surface of the shell 12 that engages a mating torque and radial transmitting profile 32, in this embodiment mating projections, disposed on an outer surface on a hub driver mechanism 34 of a wheel hub 36. The torque and radial load transmitting profile 38 is also located at the large shell base 28 on the inner surface of the shell that engages a mating load transmitting profile 40 on an outer surface of a removable cap member 42. The cap member 42 extends radially of the shell axis 18. In alternative embodiments, the cap member 42 may be coupled to a load transmitting profile disposed at an axially interior position of the shell 12 proximate the larger shell base 28 as shown in FIG. 4b. In alternative embodiments, torque and radial load transmitting profiles need not exist at both the large and small shell bases 24, 28, so long as at least one torque load transmitting profile and at least one radial load transmitting profile exist on the shell 12. In an alternative embodiment, the cap member 42, shell 12, sprockets 14 and load transmitting profiles 30, 38, 46 may embody a single piece. The cap member 42 includes a third opening 44 for receiving the hub driver mechanism 34 therethrough. The cap member 42 further includes a torque and radial load transmitting profile 46 at the third opening 44 on an inner surface of the cap member 42 that engages the mating torque and radial transmitting profile 32 on the hub driver mechanism 34. Looking to the torque and radial transmitting profile 46 of the cap member 42, radial surfaces 41 transmit radial load to the hub driver mechanism 34, and torque surfaces 43 transmit torque load to the hub driver mechanism 34. Torque and radial load transmitting profiles 30, 38 on the shell 12 have similar radial and torque surfaces. In an embodiment where only a radial load is being transmitted through the load transmitting profile, torque surfaces 43 may be eliminated.

Figure 8:
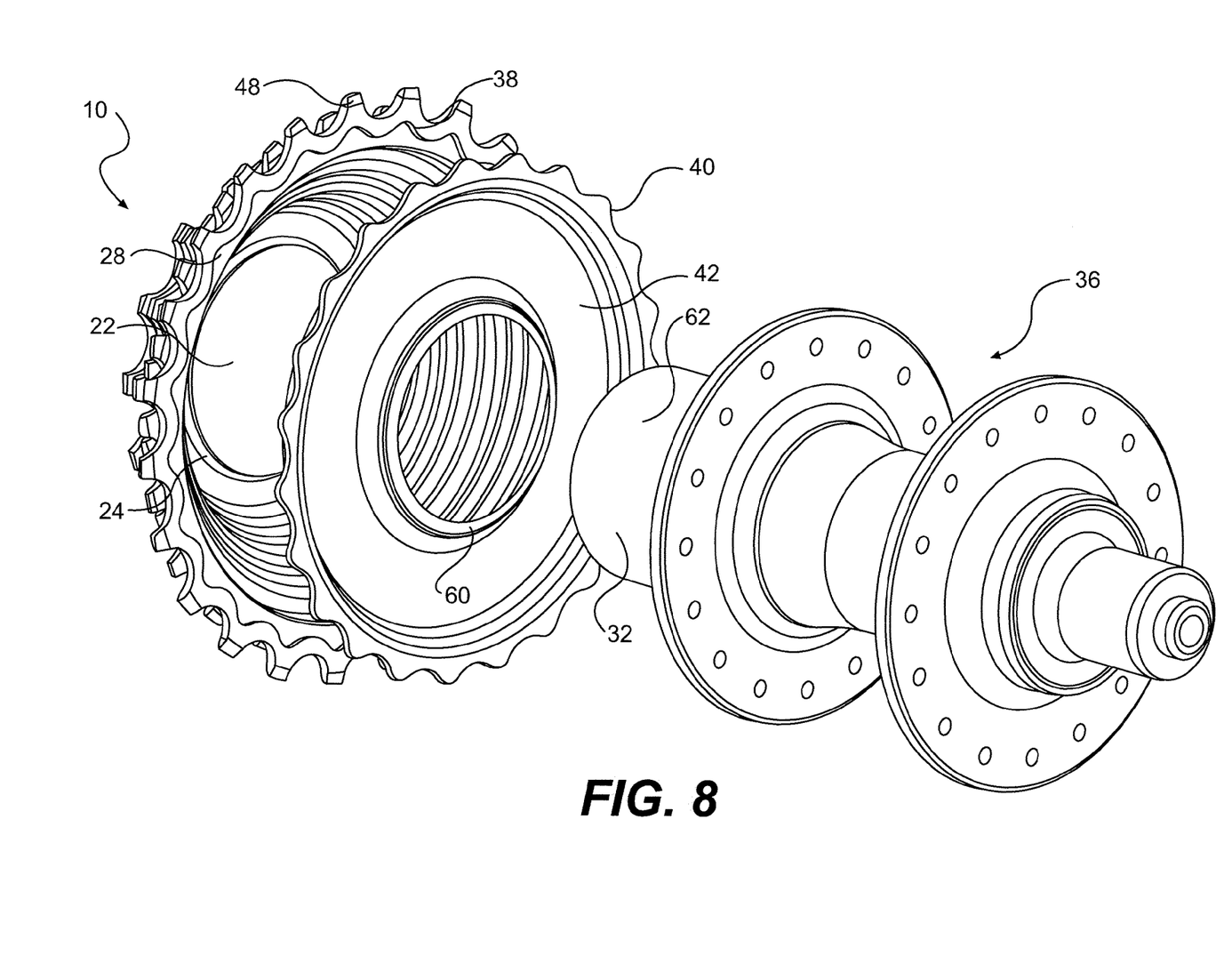
FIG. 8 is an exploded rear perspective view of a bicycle multi-gear cassette and a mating wheel hub according to another embodiment of the present invention.

In another embodiment of the invention, the torque transmitting profile may include a frictional engagement to the hub driver mechanism without the use of cooperating projections between the cassette and the hub driver mechanism according to FIG. 8. In FIG. 8 a featureless surface 60 may be used to frictional engage a mating featureless surface 62 on the hub driver mechanism.

Figure 5:
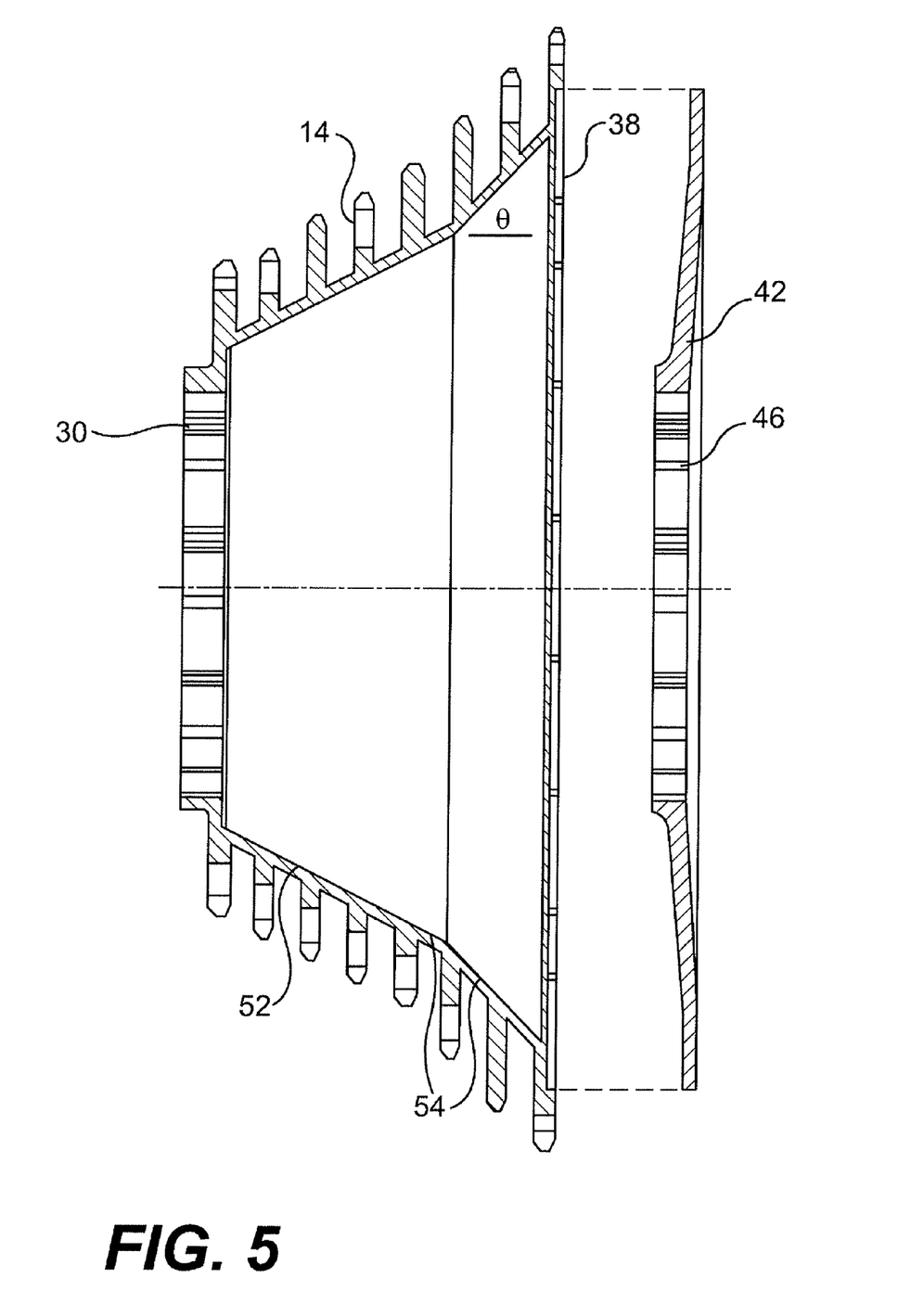
FIG. 5 is an exploded cross-sectional view of an additional embodiment of a bicycle multi-gear cassette having a tapered shell.
Figure 9:
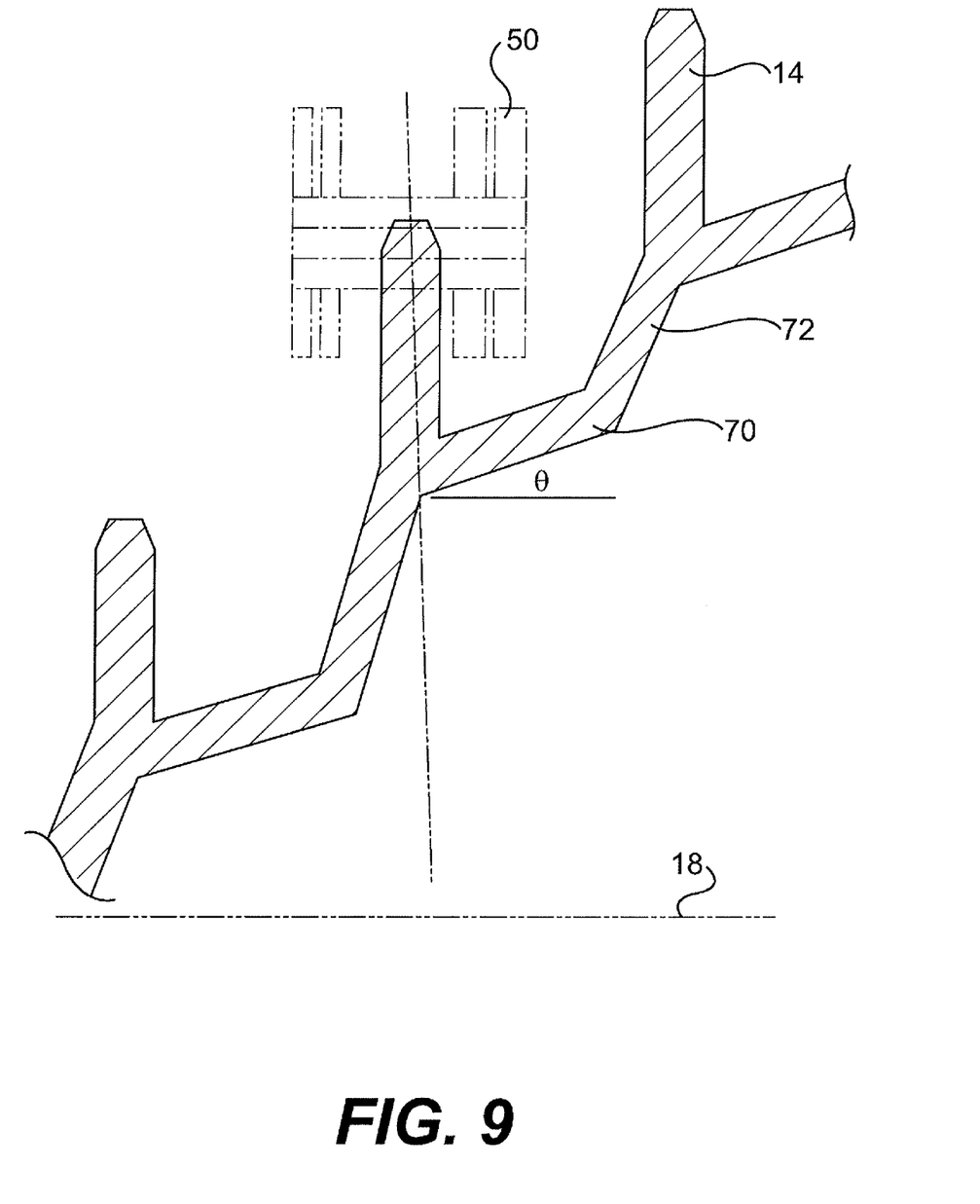
FIG. 9 is a partial cross-sectional view of a shell and sprockets of a multi-gear cassette according to another embodiment of the present invention.

In the embodiment of FIG. 5, a shell 52 includes a plurality of tapered cone segments 54 connecting the toothed sprockets 14 wherein the tapered cone segments 54, toothed sprockets 14 and load transmitting profiles 30, 38, 46 embody a single piece. Each cone segment 54 has a thickness smaller than a thickness of the base of the adjoining sprocket 14. In a preferred embodiment, the tapered cone segments 54 form an angle θ greater than 45 degrees to provide increased bending and buckling resistance to radially loading from the chain 50. In an alternative embodiment according to FIG. 9, mildly-tapered cone segments 70 forming an angle θ less than 45 degrees may be alternatingly arranged with steep cone segments 72 forming an angle θ greater than 45 degrees.

Figure 10:
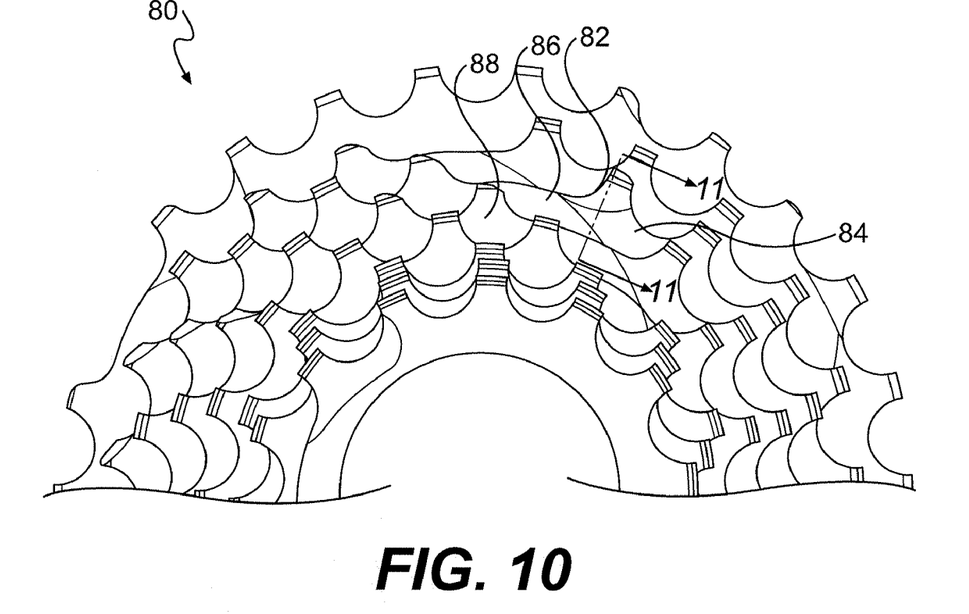
FIG. 10 is a partial front view of a bicycle multi-gear cassette according to another embodiment of the present invention.
Figure 11:
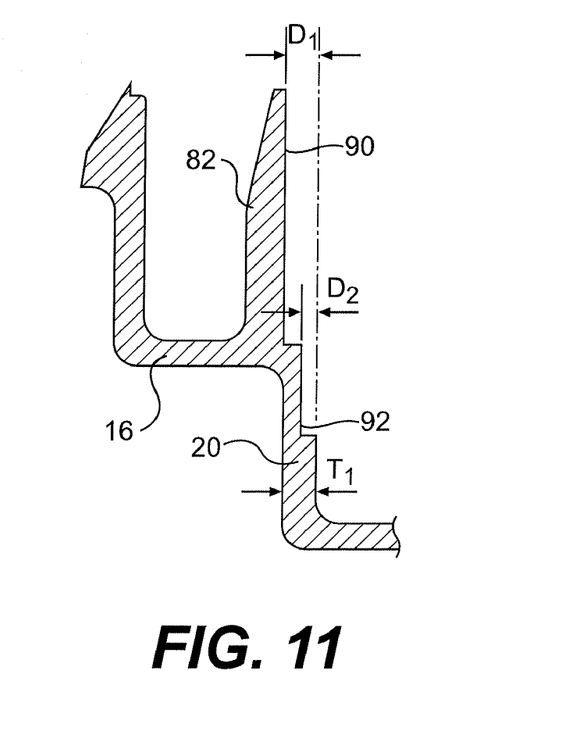
FIG. 11 is a cross-sectional view taken along line 11-11 of a portion of the bicycle multi-gear cassette of FIG. 10.
Figure 12:
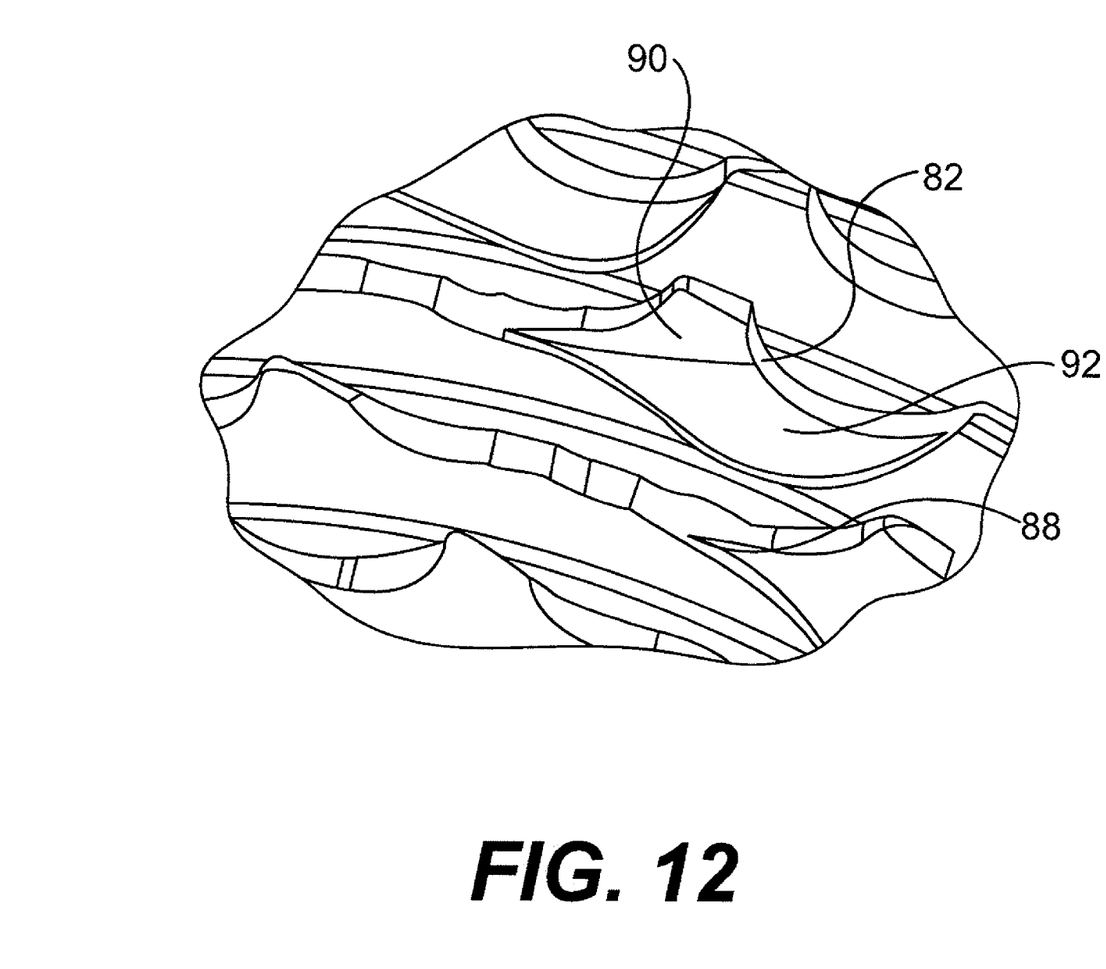
FIG. 12 is an enlarged view of a portion of the bicycle multi-gear cassette of FIG. 10.

Looking to FIGS. 10-12, another embodiment of a multi-gear cassette 80 is shown, similar to the cassette shown in FIGS. 1-4a, except that a sprocket 82 includes a recess 84 on a side 86 facing a sprocket 88 having a smaller number of teeth to accommodate a bicycle chain during shifting of the chain from the smaller sprocket 88 to the larger sprocket 82. The recess 84 may have first and second regions 90, 92. The first region 90 is formed by cutting into the outboard side 86 of the sprocket 82 a depth $D_1$ and the second region 92 is formed by cutting into the outboard side 86 of the disc 20 a depth $D_2$. The depth $D_1$ is greater than the depth $D_2$. Also, the depth $D_1$ may be greater than a thickness $T_1$ of the disc 20. If the first region 90 were extended radially inwardly into the adjoining disc 20, the integrity of the structure would be compromised. A recess with only a single depth at $D_2$ would inhibit proper chain shifting performance. Accordingly, the present invention includes the recess 84 with two regions 90, 92 at two depths $D_1$ and $D_2$ to ensure proper shifting without compromising the structure of the cassette 10.

Figure 13:
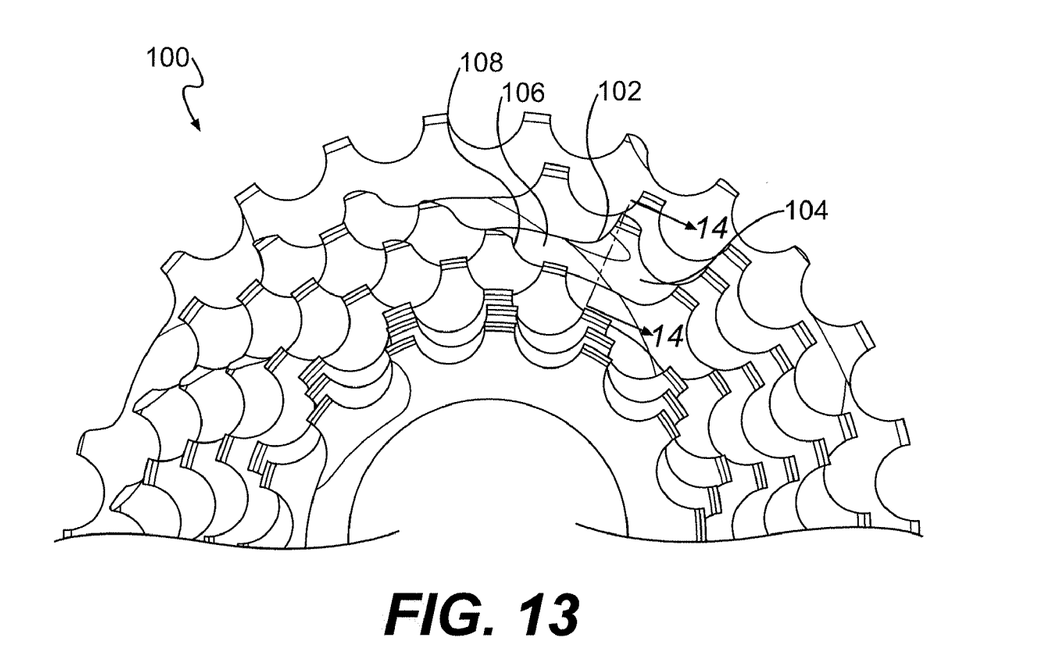
FIG. 13 is a partial front view of a bicycle multi-gear cassette according to another embodiment of the present invention.
Figure 14:
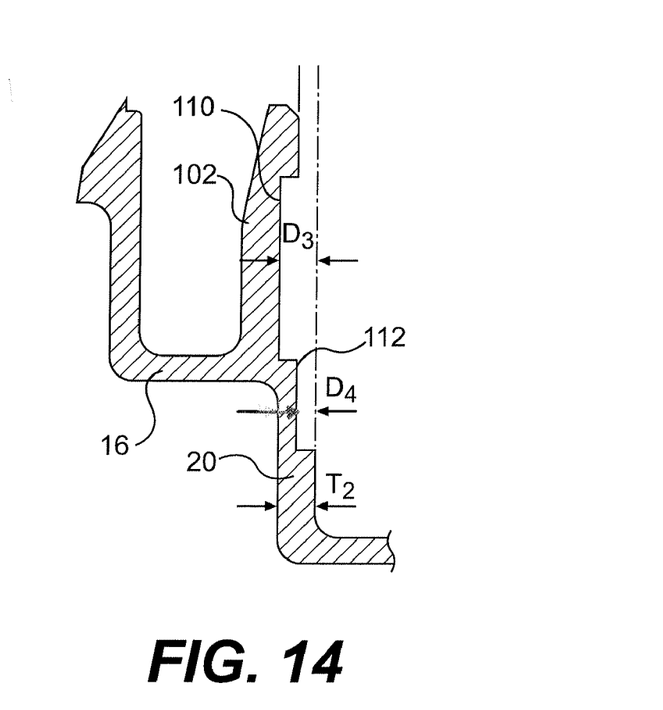
FIG. 14 is a cross-sectional view taken along line 14-14 of a portion of the bicycle multi-gear cassette of FIG. 13.

Looking to FIGS. 13 and 14, another embodiment of a multi-gear cassette 100 is shown, similar to the cassette shown in FIGS. 10-12, except that a sprocket 102 includes a recess 104 on a side 106 facing a sprocket 108 having a smaller number of teeth. The recess 104 may have first and second regions 110, 112. The first region 110 is formed by partially cutting into the outboard face of the sprocket 102 a depth $D_3$ and the second region 112 is formed by cutting into the outboard face of the disc 20 a depth $D_4$. The depth $D_3$ is greater than the depth $D_4$. Also, the depth $D_3$ may be greater than a thickness $T_2$ of the disc 20.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A bicycle multi-gear cassette mountable to a wheel hub, the cassette comprising:
   a truncated conical shell including:
      a plurality of coaxial annular cylinders of variable diameter extending along an axis of the shell, and
      a plurality of coaxial annular discs of variable diameter extending radially of the axis, the cylinders and discs alternatingly arranged in a stepped sequence; and
   a plurality of toothed sprockets having different numbers of teeth disposed on the shell and extending radially of the axis, at least one of the plurality of toothed sprockets and the shell including a recess on a side of the at least one of the plurality of toothed sprockets and the shell facing an adjacent toothed sprocket having a smaller number of teeth, the recess including a first region having a first depth and a second region having a second depth, the first depth greater than the second depth, the first region disposed on the sprocket, the second region disposed on the shell adjacent the sprocket, the shell and the plurality of toothed sprockets being a single-piece construction.

2. A bicycle multi-gear cassette according to claim 1, wherein the second region is disposed on the disc adjacent the sprocket.

3. A bicycle multi-gear cassette according to claim 2, wherein the first depth is greater than a thickness of the disc.

4. A bicycle multi-gear cassette according to claim 3, wherein the shell includes a first opening proximate a small shell base and a second opening proximate a large shell base, the openings coaxial with the axis of the shell.

5. A bicycle multi-gear cassette according to claim 4, further comprising a torque load transmitting profile configured on the shell proximate one of the small and large shell bases and a radial load transmitting profile configured on the shell proximate one of the small and large shell bases, wherein the shell, sprockets and the load transmitting profiles are a single-piece construction.

6. A bicycle multi-gear cassette according to claim 5, wherein the radial load transmitting profile is configured on the shell proximate the large shell base, the cassette further comprising:
    a cap member extending radially of the central axis coupled to the radial load transmitting profile proximate the large shell base,
    the cap member including a third opening coaxial with the shell axis for receiving the wheel hub,
    a second radial load transmitting profile configured at the third opening for transmitting radial load to the wheel hub,
    the first opening proximate the small shell base configured for receiving the wheel hub,
    a third radial load transmitting profile configured at the first opening for transmitting radial load to the wheel hub.

7. A bicycle multi-gear cassette according to claim 6, wherein the torque load transmitting profile is configured on the shell proximate the large shell base, the cap member further comprising:
    a second torque load transmitting profile configured at the third opening for transmitting torque load to the wheel hub.

8. A bicycle multi-gear cassette according to claim 5, wherein the torque load transmitting profile is configured on one of the discs and cylinders, and the radial load transmitting profile is configured on one of the discs and cylinders.

9. A bicycle multi-gear cassette according to claim 1, wherein the shell includes a first opening proximate a small shell base and a second opening proximate a large shell base, the openings coaxial with the axis of the shell.

10. A bicycle multi-gear cassette according to claim 9, further comprising a torque load transmitting profile configured on the shell proximate one of the small and large shell bases and a radial load transmitting profile configured on the shell proximate one of the small and large shell bases, wherein the shell, sprockets and the load transmitting profiles are a single-piece construction.

11. A bicycle multi-gear cassette according to claim 10, wherein the radial load transmitting profile is configured on the shell proximate the large shell base, the cassette further comprising:
    a cap member extending radially of the central axis coupled to the radial load transmitting profile proximate the large shell base,
    the cap member including a third opening coaxial with the shell axis for receiving the wheel hub,
    a second radial load transmitting profile configured at the third opening for transmitting radial load to the wheel hub,
    the first opening proximate the small shell base configured for receiving the wheel hub,
    a third radial load transmitting profile configured at the first opening for transmitting radial load to the wheel hub.

12. A bicycle multi-gear cassette according to claim 11, wherein the torque load transmitting profile is configured on the shell proximate the large shell base, the cap member further comprising:
    a second torque load transmitting profile configured at the third opening for transmitting torque load to the wheel hub.

13. A bicycle multi-gear cassette mountable to a wheel hub, the cassette comprising:
    truncated conical shell means including:
        a plurality of coaxial annular cylinders of variable diameter extending along an axis, and
        a plurality of coaxial annular discs of variable diameter extending radially of the axis, the cylinders and discs alternatingly arranged in a stepped sequence; and
    a plurality of toothed sprockets having different numbers of teeth disposed on the shell means and extending radially of the axis, at least one of the plurality of toothed sprockets and the shell including a recess on a side of the at least one of the plurality of toothed sprockets and the shell facing an adjacent toothed sprocket having a smaller number of teeth, the recess including a first region having a first depth and a second region having a second depth, the first depth greater than the second depth, the first region disposed on the sprocket, the second region disposed on the shell means adjacent the sprocket,
    the shell means and the sprockets being a single-piece construction.

14. A bicycle multi-gear cassette according to claim 13, wherein the second region is disposed on the disc adjacent the sprocket.

15. A bicycle multi-gear cassette according to claim 14, wherein the first depth is greater than a thickness of the disc.

16. A bicycle multi-gear cassette according to claim 6, wherein the shell, sprockets, loading transmitting profiles and cap member are a single piece.

17. A bicycle multi-gear cassette according to claim 11, wherein the shell, sprockets, loading transmitting profiles and cap member are a single piece.

* * * * *